(12) United States Patent
Karri et al.

(10) Patent No.: US 12,731,102 B2
(45) Date of Patent: Sep. 8, 2026

(54) METHODS, SYSTEMS, AND COMPUTER PROGRAM PRODUCTS FOR A USER CONTEXT-AWARE WEBSITE OPTIMIZATION FRAMEWORK

(71) Applicant: INTERNATIONAL BUSINESS MACHINES CORPORATION, Armonk, NY (US)

(72) Inventors: Venkata Vara Prasad Karri, Visakhapatnam (IN); Hemant Kumar Sivaswamy, Pune (IN); Shikhar Kwatra, San Jose, CA (US); Preethi Balakrishnan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 17/967,573

(22) Filed: Oct. 17, 2022

(65) Prior Publication Data

US 2024/0127321 A1 Apr. 18, 2024

(51) Int. Cl.
*G06Q 30/00* (2023.01)
*G06Q 10/083* (2023.01)
(Continued)

(52) U.S. Cl.
CPC ..... *G06Q 30/0639* (2013.01); *G06Q 10/0838* (2013.01); *G06Q 10/40* (2026.01); *G06Q 30/0633* (2013.01)

(58) Field of Classification Search
CPC ......... G06Q 30/0633; G06Q 30/06331; G06Q 30/06332; G06Q 30/06333;
(Continued)

(56) References Cited

U.S. PATENT DOCUMENTS 7,206,757 B2 4/2007 Seigel et al.
8,112,471 B2 2/2012 Wei et al.
(Continued)

FOREIGN PATENT DOCUMENTS

CA 2461525 A1 9/2004

OTHER PUBLICATIONS

P. Naik, P. V. Desai and S. Pati, "Location Based Place Recommendation using Social Network," 2019 IEEE 5th International Conference for Convergence in Technology (I2CT), Bombay, India, 2019, pp. 1-5, doi: 10.1109/12CT45611.2019.9033625. (Year: 2019).*
(Continued)

*Primary Examiner* — Arielle E Weiner
(74) *Attorney, Agent, or Firm* — CHIP LAW GROUP

(57) ABSTRACT

Computer-based provision of recommendations includes determining an item of interest to a user and a geographic region of the user. The item, as available from different e-commerce websites (websites) of geographic regions that are different from the geographic region of the user are aggregated within blockchain. Social network data for the user is retrieved and processed using natural language processing to determine contacts of the user located in the geographic regions of the websites. A likelihood of each contact traveling to the geographic region of the user is determined based on the social networking data. A website is selected that offers the item and that corresponds to a geographic region of a selected contact. The selected contact of the user has at least a minimum likelihood of traveling to the geographic region of the user. The selected website is presented to the user as an option for obtaining the item.

20 Claims, 4 Drawing Sheets

(51) Int. Cl.
*G06Q 10/40* (2026.01)
*G06Q 30/0601* (2023.01)

(58) Field of Classification Search
CPC ......... G06Q 30/06334; G06Q 30/0635; G06Q 30/0637; G06Q 10/083; G06Q 10/087; G06Q 30/0639; G06Q 10/0838; G06Q 50/01
See application file for complete search history.

(56) References Cited

U.S. PATENT DOCUMENTS

| | | | | |
|---|---|---|---|---|
| 8,533,780 | B2 | 9/2013 | Parla et al. | |
| 8,635,119 | B1 | 1/2014 | Hariharan et al. | |
| 9,230,277 | B2 | 1/2016 | Cook et al. | |
| 9,916,557 | B1 * | 3/2018 | Gillen | G06Q 50/00 |
| 11,288,669 | B1 * | 3/2022 | Kim | G06N 20/00 |
| 11,568,459 | B2 * | 1/2023 | Haimovitch | G06Q 30/0631 |
| 2012/0173308 | A1 * | 7/2012 | Brown | G06Q 30/0207 705/14.1 |
| 2013/0024465 | A1 * | 1/2013 | Schiff | G06F 16/24578 707/E17.005 |
| 2014/0172629 | A1 | 6/2014 | Dogin et al. | |
| 2014/0279187 | A1 * | 9/2014 | Gopinath | G06Q 50/01 705/26.7 |
| 2014/0304059 | A1 * | 10/2014 | Wang | G06Q 30/0234 705/14.34 |
| 2019/0205832 | A1 * | 7/2019 | Henderson, II | G06Q 10/0836 |

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

"Determining Trusted Individuals for Groupings of Item Shipment through Utilization of Social Networks and Location Data," [online] IP.com Prior Art Database Technical Disclosure, No. IPCOM000191211D, Dec. 21, 2009, retrieved from the Internet: <https://ip.com/IPCOM/000191211>, 3 pg.

"Method to Optimize eCommerce Order Fulfillment Using Cognitive Analysis of Social Media Data," [online] IP.com Prior Art Database Technical Disclosure, No. IPCOM000257664D, retrieved from the Internet: <https://ip.com/IPCOM/000257664>, 8 pg.

* cited by examiner

FIG. 4

METHODS, SYSTEMS, AND COMPUTER PROGRAM PRODUCTS FOR A USER CONTEXT-AWARE WEBSITE OPTIMIZATION FRAMEWORK

BACKGROUND

This disclosure relates to a website optimization framework and, more particularly, to a website optimization framework that is aware of user context.

Many electronic commerce websites (e-commerce websites) are organized into multiple sub-sites or stores that are particular to different geographic regions. As users interact with an e-commerce website, the e-commerce website typically detects the particular geographic region in which the user is located based on the Internet Protocol (IP) address of the user. The e-commerce website then directs the user to the particular sub-site or store therein that matches or corresponds to the detected geographic region of the user. In some cases, however, the user may wish to browse the products available in a sub-site or store of the e-commerce website that is for a different geographic region than that of the user. Available e-commerce frameworks do not account for such situations or the various factors that may lead one to browse items from different geographically diverse sub-sites or stores.

SUMMARY

In one or more embodiments, a computer-implemented method of providing recommendations includes, based on user-specified input, determining an item of interest to a user and a geographic region of the user. The method includes aggregating, within a ledger of a blockchain, the item of interest as available from a plurality of electronic commerce websites of geographic regions that are different from the geographic region of the user. The method includes retrieving social networking data for the user and processing the social networking data using natural language processing to determine contacts of the user located in the geographic regions of the plurality of electronic commerce websites. The method includes determining a likelihood of each contact traveling to the geographic region of the user based on the social networking data. The method includes selecting an electronic commerce web site from the plurality of electronic commerce websites that offers the item of interest or a similar item and that corresponds to a geographic region of a selected contact. The selected contact of the user has at least a minimum likelihood of traveling to the geographic region of the user. The method includes presenting the selected electronic commerce website to the user as an option for obtaining the item or the similar item.

In one aspect, the method includes presenting the selected contact to the user as a shipping option for delivery of the item or the similar item.

In another aspect, the likelihood of traveling to the geographic region of the user is determined based on travel history data extracted from the social networking data using the natural language processing.

In another aspect, the likelihood of traveling to the geographic region of the user is determined based on travel itinerary data extracted from the social networking data using the natural language processing.

In another aspect, the item of interest is specified in a wish-list of the user maintained in one or more electronic commerce websites or was previously viewed in one or more electronic commerce websites.

In another aspect, the selecting an electronic commerce website from the plurality of electronic commerce websites includes choosing the selected electronic commerce website based at least in part on a purchase history of the user and a quality of the item and/or the similar item.

In another aspect, the selecting an electronic commerce website from the plurality of electronic commerce websites includes choosing the selected electronic commerce website based at least in part on pricing information for the item and/or the similar item.

In another embodiment, a system includes one or more computer processors configured to execute operations as described within this disclosure.

In another embodiment, a computer program product includes one or more computer readable storage media having program instructions embodied therewith. The program instructions are executable by one or more computer processors to cause the one or more computer processors to execute operations as described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 4 illustrates an example method of providing a recommendation for purchasing an item as performed by the system of FIGS. 1, 2, and 3.

DETAILED DESCRIPTION

Figure 1:
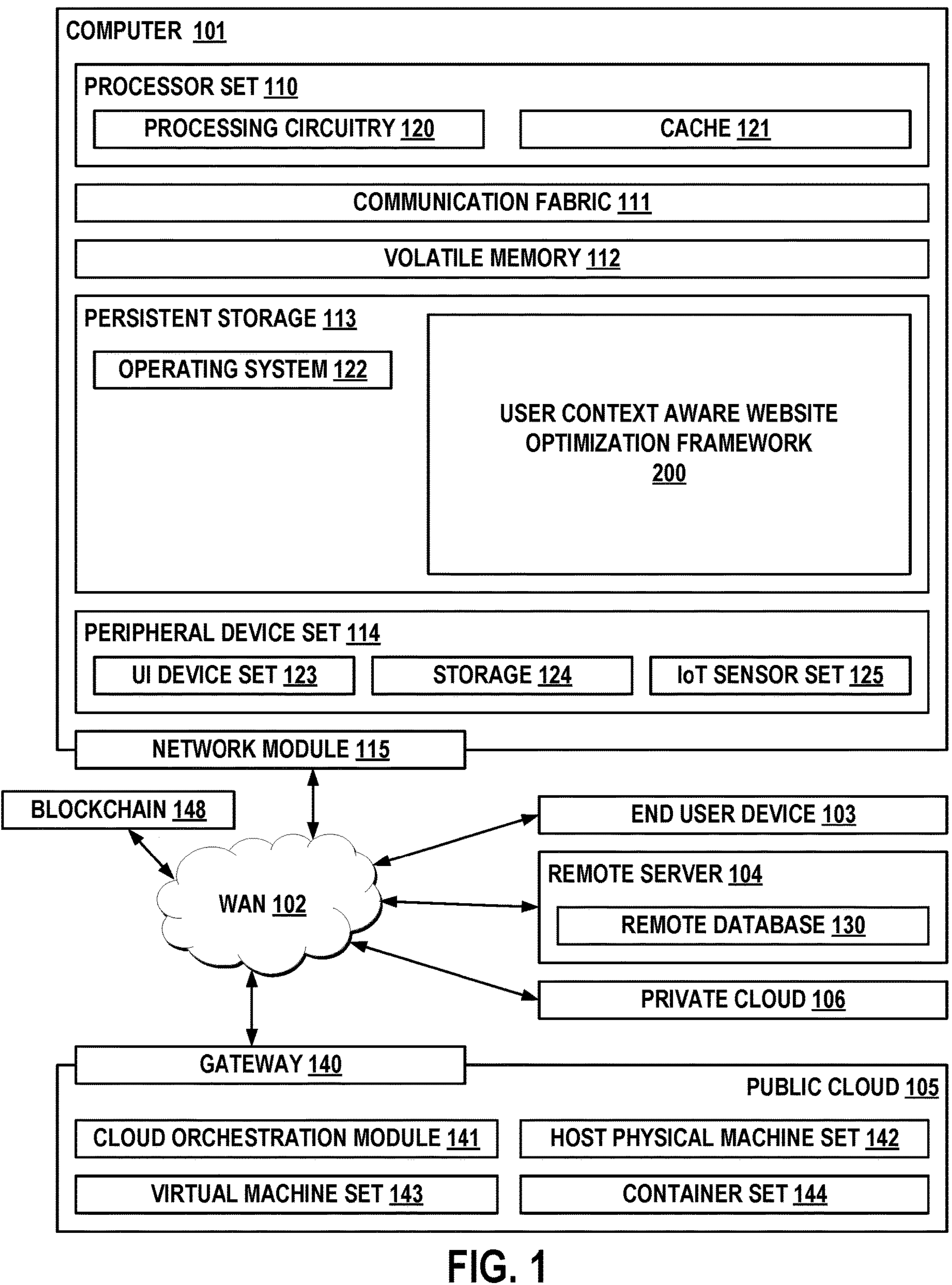
FIG. 1 illustrates an example of a computing environment that is capable of implementing a user-context aware website optimization framework.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to a website optimization framework. More particularly, the inventive arrangements relate to a web site optimization framework that is aware of user context and is capable of adapting thereto. In accordance with the inventive arrangements described within this disclosure, methods, systems, and computer program products are provided that are capable of ascertaining a user context based on various sources of information associated with the user. The user context may include various items of information obtained from social networking systems that the user has given permission to access. For a given item that the user wishes to acquire through an electronic commerce website (e-commerce websites), the inventive arrangements are capable of determining different e-commerce web sites through which the item, or another similar item, may be acquired.

The different e-commerce web sites that are suggested may be e-commerce web sites that correspond to geographic regions other than the geographic region in which the user is located. In one aspect, an e-commerce website may be selected that corresponds to a geographic region in which a contact of the user is located. As an illustrative and non-limiting example, consider a scenario in which a user is located in country A and is accessing an e-commerce website. The user is interested in viewing a particular item for sale. The e-commerce system determines that the user is located in country A and connects the user to the e-commerce web site corresponding to country A. This restricts the items that are available for purchase to the user to only those items available in the country A e-commerce website (e.g., the online store for country A).

The user, however, may wish to view and/or purchase other items that may be available through the e-commerce website or online store of a different country. In this example, the user may have a contact that resides in country B who is planning on visiting the user in country A in the near future. The inventive arrangements are capable of detecting this user context—the context of the user having a contact located in a different geographic region and having a likelihood of traveling to the geographic region of the user in the near future. Accordingly, the inventive arrangements, in recognizing this user context, are capable of suggesting to the user that the user purchase the item or a related item via the e-commerce website that corresponds to country B knowing that the contact may bring any item purchased by the user to the user in country A. Further, the inventive arrangements also may suggest to the user that the item be directed, e.g., shipped, to the contact so that the contact may bring the item on the trip for delivery to the user. In another aspect, the inventive arrangements also may suggest that the contact of the user purchase the item on behalf of the user and bring the item to the user during a forthcoming expected visit to country A.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Turning to FIG. 1, computing environment 100 contains an example of an environment for the execution of at least some of the computer code involved in performing the inventive methods, such as a user context aware website optimization (UAWO) framework 200. UAWO framework 200 is capable of aggregating data of a user from a variety of different electronic sources of information, including one or more e-commerce websites and/or social networking websites. UAWO framework 200 is capable of processing the data to determine a likelihood that a plurality of contacts of the user will travel to the geographic region in which the user is located. UAWO framework 200 is capable of recommending one or more particular e-commerce websites for obtaining one or more items that the user may wish to obtain based on the geographic region(s) of the user's contacts and the respective likelihoods that the contacts will travel to the geographic region of the user within a predetermined amount of time in the future.

In addition to UAWO framework 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors (e.g., hardware processors) of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (e.g., a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (e.g., private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Blockchain 148 is implemented as a decentralized, distributed, and private digital ledger that is used to record transactions across a plurality of computers so that the record cannot be altered retroactively without the alteration of all subsequent blocks and the consensus of the network. In one or more examples, blockchain 148 may be implemented as one or more remote servers 104, using one or more components in public cloud 105, using one or more components of private cloud 106, and/or various combinations thereof. Use of blockchain 148 provides verification and traceability for multistep transactions that also may require verification and traceability.

Figure 2:
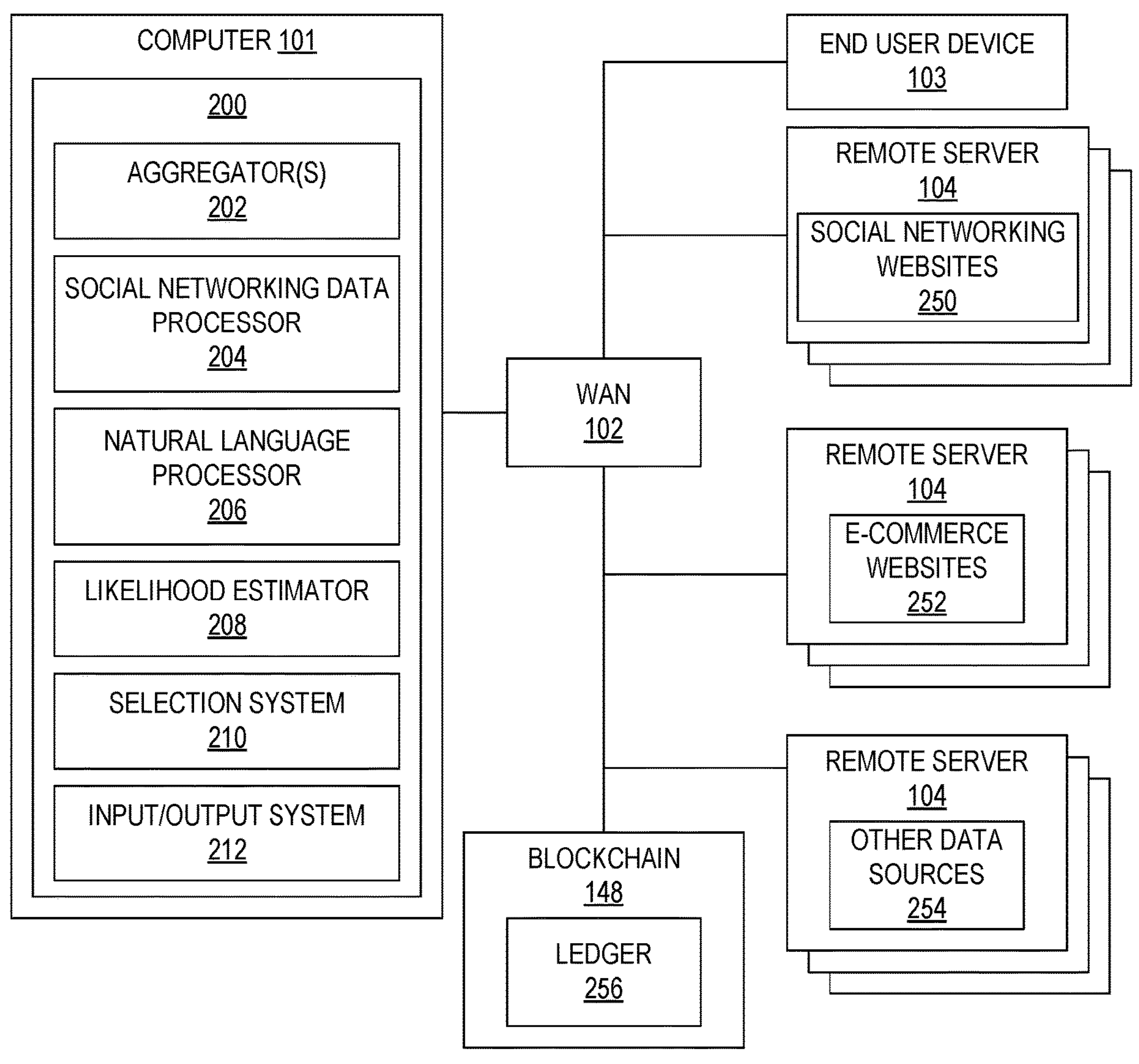
FIG. 2 illustrates another example of the computing environment of FIG. 1.

FIG. 2 illustrates another example of computing environment 100. FIG. 2 illustrates UAWO framework 200 in greater detail and certain interactions of computer 101, in executing UAWO framework 200, with other components and/or systems of computing environment 100. As illustrated, remote servers 104 may execute one or more different social networking websites 250 and/or one or more e-commerce websites 252. The social networking websites 250 and the e-commerce websites 252 are shown as executing in remote servers 104 for purposes of illustration. It should be appreciated that such websites may be executed in various other types of computing systems including the various cloud computing architectures illustrated in FIG. 1.

In the example of FIG. 2, an end user is using EUD 103. For purposes of illustration, the end user has “opted in” to share social networking data and/or e-commerce data for the various websites illustrated with UAWO framework 200. Further, contacts of the user, as described herein, have also “opted in” to share social networking data and/or e-commerce data for the various websites illustrated with UAWO framework 200.

Referring to UAWO framework 200, aggregators 202 are capable of accessing e-commerce websites 252 to obtain e-commerce data relating to the end user and store the e-commerce data within a ledger 256 of blockchain 148. In another aspect, aggregators 202 are also capable of accessing other data sources 254 to obtain other data relating to the end user and store such data within ledger 256 of blockchain 148.

Social networking processor 204 is capable of accessing social networking websites 250 to obtain or retrieve social networking data relating to the end user and/or contacts of the end user. In one aspect, social networking data for the end user and/or contacts of the end user need not be stored in blockchain 148. In one or more embodiments, social networking processor 204 may be operative to retrieve social networking data in response to the end user browsing items for sale on an e-commerce website, at a point of sale as the user uses an e-commerce website, periodically, or in response to a user query for an item or class of item. The social networking data may be retrieved and processed as needed and subsequently deleted after use as opposed to storing such data in blockchain 148. In this regard, the social networking data may be stored on a temporary and/or "as-needed" basis and deleted or purged once a recommendation has been issued. It should be appreciated, however, that the various components of UAWO framework 200 may utilize both social networking data when obtained and/or e-commerce data from blockchain 148 as needed to generate recommendations.

A social networking website 250 refers to program code that is executable and/or interpretable by one or more interconnected computing systems. The social networking website 250 allows users to build social networks or social relations among people who share similar interests, activities, backgrounds or real-life connections. Through a social networking website 250, users may send communications through different mechanisms such as by posting messages or other media, commenting on messages, posts, or other media, replying to messages, and performing other operations such as "liking" a communication or item of media, sharing the communication or item of media, expressing an emotional sentiment, and so forth. In the context of a social networking website, actions such as posting, replying, liking, sharing, expressing sentiment, and so forth are programmatic actions that are monitored and persisted within social the networking website, e.g., within a data storage device in a data structure within and/or accessible by, the social networking web site.

In the example, social networking data may include, but is not limited to, contacts of the end user, communications exchanged between the end user and contacts of the end user via the social networking web sites 250, and/or geographic regions (e.g., location data) of the contacts of the end user and/or of the end user himself/herself. E-commerce data may include item(s) selected by the user, items added to lists (e.g., shopping and/or wish lists maintained by e-commerce websites 252), historical purchase data, browsing history data, and the like. E-commerce data may also include the aforementioned data items for contacts of the end user.

Natural language processor 206 is capable of performing natural language processing on various types of data including e-commerce data, social networking data, and/or other messages. Natural language processing is a field of computer science, artificial intelligence, and linguistics which implements computer processes to facilitate interactions between computer systems and human (natural) languages. Natural language processing enables computers to derive computer-understandable meaning from natural language input. The International Organization for Standardization (ISO) publishes standards for NLP, one such standard being ISO/TC37/SC4. As part of NLP, semantic analysis may be performed. Semantic analysis may follow parsing and involve extraction of context-independent aspects of a sentence's meaning, including entities, named entities, the semantic roles of entities mentioned in the sentence, and quantification information, such as cardinality, iteration, and dependency. Natural language processor 206 is capable of extracting meaning from social networking data including electronic messages exchanged between the end user and the contacts of the end user and/or e-commerce data.

Likelihood estimator 208 is configured to analyze social networking data, as may be interpreted using natural language processor 206, to calculate a likelihood that a contact located in a different geographic region than the end user, will visit the geographic location of the end user within a predetermined amount of time in the future. Likelihood estimator 208 may use any of a variety of likelihood estimation techniques such as, for example, maximum likelihood estimation (MLE) to compute the likelihoods. In one aspect, likelihood estimator 208 is capable of calculating a likelihood based on historical travel of contacts of the end user as may be obtained from shared social networking data. Based on historical travel, likelihood estimator 208 may calculate a likelihood for each contact of the end user traveling to the geographic region of the end user within the predetermined amount of time.

In another aspect, likelihood estimator 208 may analyze travel itinerary data that may be shared or included as part of the social networking data processed by natural language processor 206. In that case, likelihood estimator 208 may calculate a likelihood of each contact of the end user traveling to the geographic region of the end user within the predetermined amount of time in the future. It should be appreciated that likelihood estimator 208 may use travel itinerary data when such data is available for a contact of the end user and may use historical travel data for contacts of the end user in cases where travel itineraries are not available.

Selection system 210 is capable of selecting a particular e-commerce website 252 from which the end user may obtain an item based on the likelihood of the end user's contacts traveling to the geographic region of the end user within the predetermined amount of time in the future. That is, in response to determining that a selected contact of the end user has a likelihood of traveling to the geographic region of the end user within the predetermined amount of time in the future that exceeds a minimum threshold, selection system 210 is capable of selecting an e-commerce website 252 that corresponds to (e.g., is the same as) the geographic region of the selected contact and that also has the item desired by the end user or another similar item available. A similar item may be an item of like quality and function.

In one or more embodiments, selection system 210 is implemented as a machine learning model that operates on the various types of data aggregated within ledger 256 of blockchain 148. In one aspect, selection system may be implemented as a Long Short-Term Memory (LSTM) model. An LSTM is a type of recurrent neural network that is capable of learning long term dependencies in data.

Input/output system 212 is capable of receiving user input from the end user via EUD 103 and providing output to the end user via EUD 103. For example, UAWO framework 200 may receive a user input specifying an item. The user input may specify the item as a particular item or as a class of item as one or more attributes that may be used to form a query. In one or more other examples, the user input may have been provided to an e-commerce web site 252 to specify an item or class of item on a wish or shopping list that may be retrieved by input/output system 212.

In operation, UAWO framework 200 is capable of providing dynamic website morphing suggestions using natural language processing, the end user's pattern history (e.g., purchase history), and geographical data. UAWO framework 200 is capable of providing dynamic website morphing suggestions to the end user for alternate e-commerce websites from which to acquire selected items. The determination of which alternate e-commerce website to use may be based on whether the item is available for a lesser price, whether the item is accessible to the end user by polling into blockchain 148 based on localization of the item, security of the item, and/or quality of the item. UAWO framework 200 is capable of polling the end user's social networking data, with permission from the end user, along with e-commerce data (e.g., financial credentials, pattern history, and/or discounts available) to cognitively route the user to a particular e-commerce website to acquire the item based on correlated item availability on a particular e-commerce web site (e.g., a particular geographic region-specific web site or online store).

In one aspect, using selection system 210, UAWO framework 200 provides artificial intelligence capability where UAWO framework 200 understands the end user's context using browsed items, wish-listed items, and/or by linking such items with social networking messages exchanged between the end user and one or more contacts of the user from the social networking data. UAWO framework 200 is capable tracking online activities of the end user, with permission, to generate the user-aware context. For example, UAWO framework 200 is capable of tracking items that were browsed and/or wish-listed and, using the social networking data, determine a best or possible location to buy and ship the item. The determination performed by selection system 210 may account for, or consider, the end user's frequent communication with the friends (e.g., contacts) across geographies via social networking websites, the travel frequency of the contacts, and/or the shopping style of the contacts (e.g., types and/or brands of goods and/or services purchased and similarity to those purchased by the end user).

As an illustrative and non-limiting example, the end user may browse items available on e-commerce web site A, which is dedicated to, or corresponds to, country A despite the end user being located in country B. The end user may add the item(s) to a wish list. The end user may also exchange one or more messages through a social networking website 250 within one or more contacts also located in country A. In this example, UAWO framework 200 derives the end user aware context based on the end user's interactions with the e-commerce website 252 and the contact(s) via the social networking website 250. Natural language processor 206 understands the context and selection system 210 proposes a mechanism by which to acquire the item. Selection system 210, based on the historical buying pattern of the end user, contacts with whom the end user communicates, suggests or recommends by way of input/output system 212 an option for the end user to purchase the item. The option may be provided as a recommendation as a message, as part of a webpage (e.g., a graphic or message displayed within or as part of the webpage), etc.

In this example, selection system 210 may recommend that the end user buy the item by way of the e-commerce website A. Selection system 210 may also recommend that the end user have the item shipped to the end user's contact that resides in country A in response to determining at least a minimum likelihood that the contact will travel to country B within a predetermined amount of time in the future. The predetermined amount of time may be a parameter that may be set by the end user. For example, the predetermined amount of time may be 1, 2, 3, 4, or more weeks or months.

Figure 3:
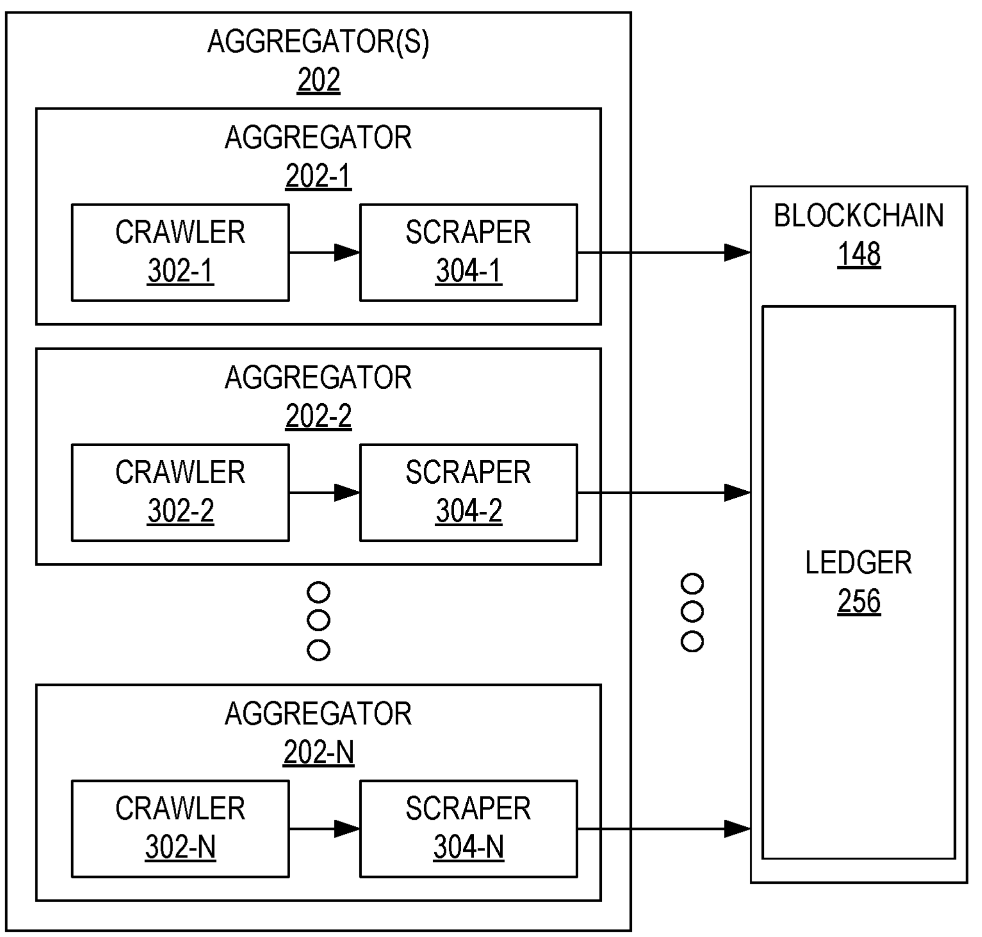
FIG. 3 illustrates an example implementation of the aggregators of FIG. 2.

FIG. 3 illustrates an example implementation of aggregators 202. In the example of FIG. 3, aggregators 202 may include a plurality of aggregators 202-1, 202-2, through 202-N. Each aggregator 202 may be configured to access a particular data source, e.g., a particular e-commerce website 252 and/or another particular data source 254. As illustrated, each aggregator 202 is capable of accessing data in a respective data source, storing and/or updating such data in ledger 256 of blockchain 148, and/or subsequently reading such data from ledger 256.

In the example, each aggregator 202 includes a crawler 302 and a scraper 304. Each crawler 302 is capable of polling one or more e-commerce websites 252 (e.g., trusted retail online outlets) for the products that are available. In an example implementation, crawler 302 may utilize a library such as the Beautiful Soup library( ) or SCRAPY. Beautiful Soup is a Python library for pulling data out of HyperText Markup Language (HTML) and eXtensible Markup Language (XML) files. The Beautiful Soup library, when used with a parser, provides mechanisms for generating a parse tree of such files and navigating, searching, and modifying the parse tree. SCRAPY is an open-source library that is capable of extracting data from websites.

Using the various libraries mentioned, for example, each crawler 302 is capable of extracting information pertaining to certain keywords from product details on e-commerce websites 252. Each crawler 302, for example, may use Rest Application Programming Interface (API) polling and integration (e.g., using an intranet system such as Honey or the Wish Merchant Platform) and coreference resolution. Each crawler 302 is capable of extracting information from the dictionary and appending the information into ledger 256.

Scrapers 304 are capable of extracting information that may be relevant or highly relevant to the end user such as the price of products and reviews of products and updates ledger 256 with such information. Scrapers 304 are capable of processing (e.g., parsing) data obtained by crawlers 302 and removing unwanted items or "noise" from the data. Scrapers 304 are the entity that is responsible for accessing data in ledger 256 of blockchain 148 (e.g., reading, writing, and/or updating). Scrapers 304 also may update ledger 256 with search engine optimization (SEO) ranking data based on the end user's previous information. Use of blockchain 148 and ledger 256 also supports being updated by multiple different scrapers 304. For example, item 1 may be updated by scraper A on quantity. Then scraper B could have updated on overall quality based on reviews. Such transaction details, e.g., all of such transaction details, may be added to ledger 256 and made available.

Ledger 256 is configured to manage blocks of data based on products. Ledger 256 may be continuously updated and polled by crawlers 302, scrapers 304, and selection systems 210. In one or more example implementations, ledger 256 may receive data via one or more message queue data streams where data is added as a series of events E, where each event E contains a JSON payload of information pertaining to the information about the end user stored in a private repository that may be parsed from the crawlers 302.

Selection system 210 (e.g., of FIG. 2) may utilize the aggregated data in ledger 256 to select a particular item (e.g., product) available on an e-commerce website irrespective of the end user's physical location (e.g., geographic region) and/or the geographic region to which the e-commerce website corresponds. Selection system 210 is capable of determining social networking information for the end user at or about a time of product purchase or product browsing by polling social networking websites 250 to determine a particular e-commerce web site from which to purchase the product and a particular contact to which the product may be routed or shipped.

Figure 4:
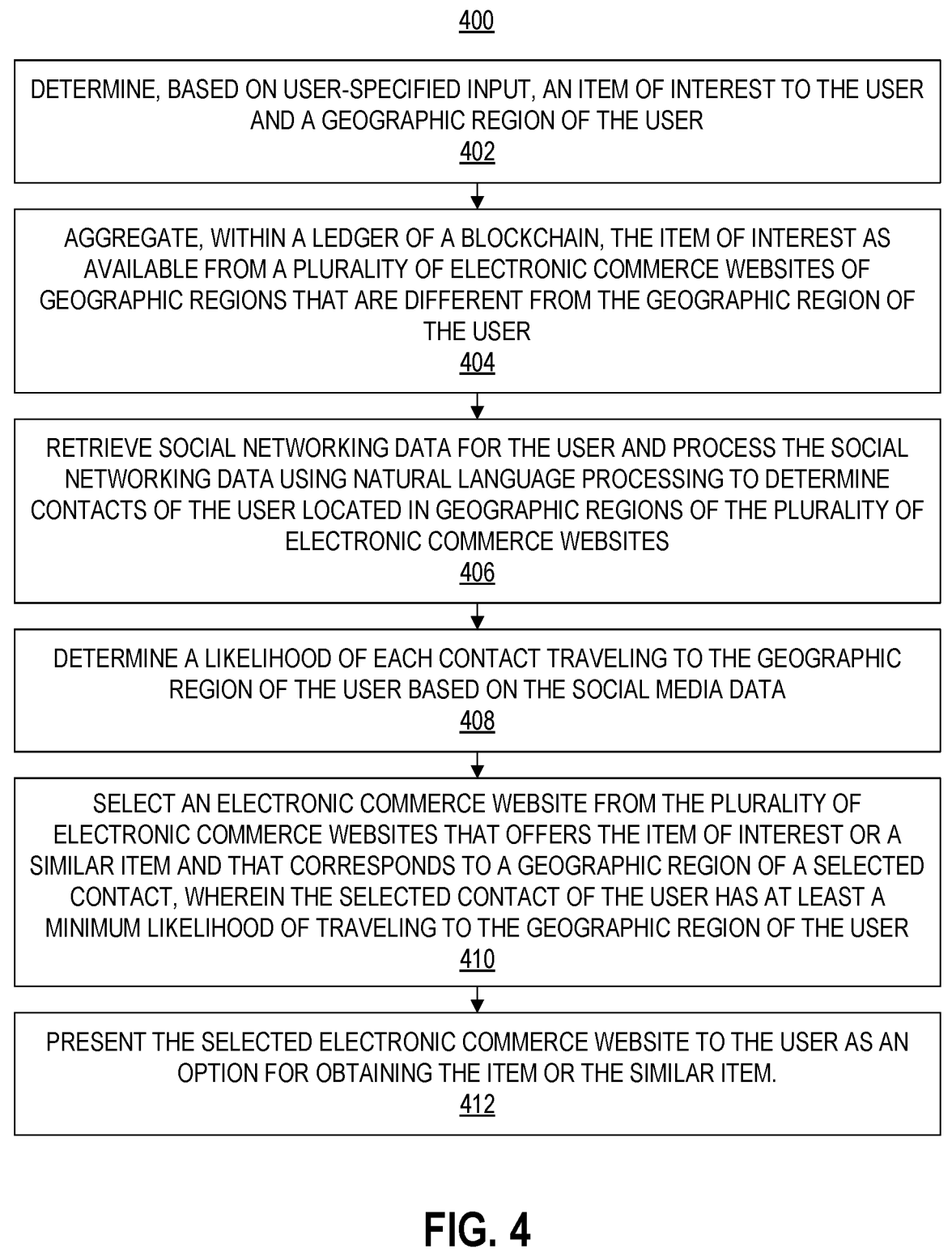

FIG. 4 illustrates an example method 400 of providing a recommendation for purchasing an item. Method 400 may be performed by a computing system that includes one or more components described in connection with FIGS. 1, 2, and/or 3.

In block 402, based on a user-specified input, the system determines an item of interest to the user and a geographic region of the user. For example, UAWO framework 200 is capable of determining one or more items of interest based on a user query for the item directed to an e-commerce website from an end user using EUD 103, one or more items browsed or previously viewed on an e-commerce website by the end user using EUD 103, or one or more items from a list of items created by the end user using EUD 103 on the e-commerce website. The geographic region of the user may be determined from a profile of the user stored in the e-commerce website, from information contained in the user query (e.g., IP address), or other known mechanism.

In block 404, UAWO framework 200 aggregates, within the ledger of blockchain 148, the item of interest as available from a plurality of different e-commerce websites of geographic regions that are different from the geographic region of the user. As discussed, the aggregators 202 are capable of locating the item as available from different e-commerce websites, where the e-commerce websites correspond to geographic regions that are different from the geographic region of the user.

As an illustrative and non-limiting example, if the user is located in country A, UAWO framework 200 is capable of finding e-commerce websites devoted to users located in other countries that also have the item available for purchase. In one or more other examples, UAWO framework 200 may find e-commerce websites for other countries that have a comparable or similar item available for purchase. For example, in block 404, UAWO framework 200 may locate an e-commerce web site for country B, for country C, and for country D, where each such e-commerce website has the item of interest to the user available for purchase.

Within this disclosure, countries are used as examples of geographic regions. It should be appreciated that other geographic regions may be used in place of countries. Examples include, but are not limited to, states, counties, cities, continents, and/or groups of countries.

In block 406, UAWO framework 200 retrieves social networking data for the user. For example, social networking data processor 204 accesses one or more social networking websites to obtain social networking data for the user. Social networking data processor 204 may also access one or more social networking websites to obtain social networking data for the contacts of the user. As noted, it is presumed that the user, and contacts of the user, have opted in to share such data with UAWO framework 200. The retrieved social networking data may include a list of contacts, communications exchanged between the user and the contacts, and/or metadata for the communications (e.g., IP addresses, dates, times, duration, etc.).

UAWO framework 200 is also capable of processing the social networking data using natural language processor 206 to determine contacts of the user that are located in geographic regions of the plurality of electronic commerce websites. As an illustrative and non-limiting example, the natural language processor 206 is capable of processing the social networking data to determine one or more contacts of the user that are located in country B, country C, and/or country D. For ease of description, the UAWO framework 200 identifies a contact B located in country B, a contact C located in country C, and a contact D located in country D.

In block 408, the UAWO framework 200 determines a likelihood of each of the determined contacts traveling to the geographic region of the user within a predetermined amount of time in the future. For example, likelihood estimator 208 is capable of estimating the likelihood that each of contacts B, C, and D will travel to country A within a predetermined amount of time of the estimation, e.g., within the next 3 months.

In one aspect, likelihood estimator 208 is capable of determining the likelihood of a contact of the user traveling to the geographic region of the user based on travel history data extracted from the social networking data using natural language processor 206. For example, the likelihood estimator 208 is capable of detecting historical travel patterns of each contact from the travel history data and calculating the likelihood that each contact will travel to the geographic region of the user within the predetermined amount of time based in the future based on the historical travel patterns.

In another aspect, likelihood estimator 208 is capable of determining the likelihood of each contact traveling to the geographic region of the user based on travel itinerary data extracted from the social networking data using the natural language processor 206. For example, the likelihood estimator 208 is capable of analyzing travel itinerary data for upcoming travels destinations, dates, and/or times for the contacts of the user to determine whether any of the contacts are planning on traveling to the geographic location of the user within the predetermined amount of time in the future.

In block 410, UAWO framework 200 is capable of selecting an electronic commerce website from the plurality of electronic commerce websites that offers the item of interest or a similar item and that corresponds to, or is for a same, geographic region of a selected contact of the user. For example, selection system 210 is capable of selecting the contact of the user having a likelihood of traveling to country A that exceeds the threshold and selecting, in turn, the e-commerce website for the same geographic region as the selected contact. For purpose of illustration and not limitation, selection system 210 may determine that contact C has a likelihood of visiting country A that exceeds the minimum threshold. In that case, selection system 210 selects e-commerce website C for use in providing a recommendation to the user.

In block 412, UAWO framework 200 presents the selected e-commerce website to the user as an option for obtaining the item or the similar item. For example, input/output system 212 is capable of providing a recommendation to EUD 103 indicating that the user should consider acquiring the item from e-commerce website C. The indication may be a webpage, a modification to a webpage, or other electronic message provided to the EUD 103.

In addition, UAWO framework 200 may also present the selected contact to the user as a shipping option for delivery of the item or the similar item. For example, UAWO framework 200 may recommend that the user purchase the item via e-commerce website C and have the item shipped to an address of contact C with the expectation that contact C will travel to country A within the predetermined amount of time to deliver the item to the user.

It should be appreciated that in cases where the likelihood of more than one contact of the user exceeds the threshold, UAWO framework 200 may give more than one e-commerce website and/or contact as recommendation options for acquiring the item. In still another example, UAWO framework 200 may choose the contact of the user with the highest likelihood and select the e-commerce website that corresponds to the selected user as the recommendation.

It also should be appreciated that other factors may be used in selecting a particular e-commerce website as the recommendation for the user. Such other factors may include, but are not limited to, purchase history of the user, item quality, and/or pricing information for the item.

For purposes of illustration, consider another example where a user is located in country A and browses for a musical instrument from an e-commerce website for country B. The e-commerce web site for country B detects the incoming IP address of the user and determines that the user is browsing from country A. The e-commerce web site for country B may attempt to direct the user to the e-commerce website for country A. This may be the case based on a presumption that the user is browsing the e-commerce web site for country B in error and/or that the shipping for purchases from the e-commerce website for country B to the user will be too costly. The e-commerce system may also recommend alternative items for purchase that are available from the e-commerce web site for country A.

In this example, the user continues browsing items in the e-commerce website for country B. UAWO framework 200 determines that the user has one or more contacts that live in country A and that frequently travel to country B. Social networking data processor 204, e.g., which may be implemented as an artificial intelligence bot operating with the user's permission, may check the items that are available in the e-commerce website for country B and check the contacts and communication the user has with the contacts from the social networking data. If the item is purchased through the e-commerce website for country B, the item may be delivered to a selected one of the contacts, who then could bring the item to the user during a next visit to country A. Social networking processor 204 in combination with likelihood estimator 208 is capable of using past history chat(s), browsed, and/or wish listed items to recommend and/or suggest the most probable contact of the user that can bring the item to the user if purchased. In another example, the system may recommend that the selected contact purchase the item through the e-commerce website for country B on behalf of the user. The selected contact could then bring the item to the user during an upcoming trip to country A. The inventive arrangements utilize travel data (e.g., histories and/or itineraries) based on users willingly sharing such data with UAWO framework 200. In other examples, UAWO framework 200 may suggest other places (e.g., geographic regions) where the user has not explicitly browsed based on the best offer available (e.g., in terms of quality and/or price) and the detection of a contact of the user who is likely to travel from that geographic region to buy and/or bring to item to the user.

The terminology used herein is for the purpose of describing particular embodiments only and is not intended to be limiting. Notwithstanding, several definitions that apply throughout this document now will be presented.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "computer processor" or "hardware processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of providing recommendations, the computer-implemented method comprising:

determining, by a framework and based on a user-specified input received via a first user interface displayed on a user device of a user, an item of interest to the user and a first geographic region of the user;

accessing, by the framework, a plurality of electronic commerce websites of a plurality of geographic regions that are different from the first geographic region;

based on a determination that the item of interest is available at the plurality of electronic commerce websites of the plurality of geographic regions, aggregating and storing, by the framework, data associated with the item of interest within a ledger of a blockchain implemented on one or more remote servers;

retrieving, by the framework, social networking data for the user, from a remote server of social networking website, and processing the social networking data using natural language processing (NLP);

determining, by the framework, contacts of the user that are located in the plurality of geographic regions of the plurality of electronic commerce websites based on the processing of the social networking data using the NLP;

determining, by the framework, a likelihood of each contact of the contacts traveling to the first geographic region based on the social networking data;

selecting, by the framework and from the contacts, a contact having a likelihood greater than a likelihood threshold;

selecting, by the framework, an electronic commerce website from the plurality of electronic commerce websites that offers the item of interest or a similar item, wherein the selected electronic commerce website corresponds to a second geographic region, of the plurality of geographic regions, of the selected contact;

presenting the selected electronic commerce website to the user, via the first user interface displayed on the user device of the user, as an option for obtaining the item of interest or the similar item, wherein the selected electronic commerce website is presented to the user as a dynamic website morphing suggestion, and in response to receiving a selection of the option via the user device of the user, routing the user from the first user interface to the selected electronic commerce website; and deleting the social networking data from a temporary storage, based on the presenting of the selected electronic commerce website.

2. The computer-implemented method of claim 1, further comprising:

presenting the selected contact to the user as a shipping option for delivery of the item of interest or the similar item.

3. The computer-implemented method of claim 1, further comprising:

extracting travel history data of the contacts from the social networking data using the NLP; and determining the likelihood of each contact of the contacts traveling to the first geographic region based on the extracted travel history data.

4. The computer-implemented method of claim 1, further, comprising:

extracting travel itinerary data of the contacts from the social networking data using the NLP; and determining the likelihood of each contact of the contacts traveling to the first geographic region based on the extracted travel itinerary data.

5. The computer-implemented method of claim 1, wherein the item of interest is specified in a wish-list of the user, the wish-list being maintained in one or more electronic commerce websites of the plurality of electronic commerce websites, or the item of interest was previously viewed in the one or more electronic commerce websites.

6. The computer-implemented method of claim 1, wherein the selecting of the electronic commerce website from the plurality of electronic commerce websites includes choosing the electronic commerce website based on a purchase history of the user and a quality of the item of interest.

7. The computer-implemented method of claim 1, wherein the selecting of the electronic commerce website from the plurality of electronic commerce websites includes choosing the electronic commerce website based on pricing information for the item of interest or the similar item.

8. A system, comprising:

one or more computer processors configured to execute operations including:

determining, based on a user-specified input received via a first user interface displayed on a user device of a user, an item of interest to the user and a first geographic region of the user;

accessing a plurality of electronic commerce websites of a plurality of geographic regions that are different from the first geographic region;

based on a determination that the item of interest is available at the plurality of electronic commerce websites of the plurality of geographic regions, aggregating and storing data associated with the item of interest within a ledger of a blockchain implemented on one or more remote servers;

retrieving social networking data for the user, from a remote server of social networking website, and processing the social networking data using natural language processing (NLP);

determining contacts of the user that are located in the plurality of geographic regions of the plurality of electronic commerce websites based on the processing of the social networking data using the NLP;

determining a likelihood of each contact of the contacts traveling to the first geographic region based on the social networking data;

selecting, from the contacts, a contact having a likelihood greater than a likelihood threshold;

selecting an electronic commerce website from the plurality of electronic commerce websites that offers the item of interest or a similar item, wherein the selected electronic commerce website corresponds to a second geographic region, of the plurality of geographic regions, of the selected contact;

presenting the selected electronic commerce website to the user, via the first user interface displayed on the user device of the user, as an option for obtaining the item of interest or the similar item, wherein the selected electronic commerce website is presented to the user as a dynamic website morphing suggestion, and in response to receiving a selection of the option via the user device of the user, routing the user from the first user interface to the selected electronic commerce website; and deleting the social networking data from a temporary storage, based on the presenting of the selected electronic commerce website.

9. The system of claim 8, wherein the operations further comprise:

presenting the selected contact to the user as a shipping option for delivery of the item of interest or the similar item.

10. The system of claim 8, wherein the operations further comprise:

extracting travel history data of the contacts from the social networking data using the NLP; and determining the likelihood of each contact of the contacts traveling to the first geographic region based on the extracted travel history data.

11. The system of claim 8, wherein the operations further comprise:

extracting travel itinerary data of the contacts from the social networking data using the NLP; and determining the likelihood of each contact of the contacts traveling to the first geographic region based on the extracted travel itinerary data.

12. The system of claim 8, wherein the item of interest is specified in a wish-list of the user, the wish-list being maintained in one or more electronic commerce websites of the plurality of electronic commerce websites, or the item of interest was previously viewed in the one or more electronic commerce websites.

13. The system of claim 8, wherein the selecting of the electronic commerce website from the plurality of electronic commerce websites includes choosing the electronic commerce website based on a purchase history of the user and a quality of the item of interest.

14. The system of claim 8, wherein the selecting of the electronic commerce website from the plurality of electronic commerce websites includes choosing the electronic commerce website based on pricing information for the item of interest or the similar item.

15. A computer program product comprising one or more computer readable storage media having program instructions embodied therewith, the program instructions executable by one or more computer processors to cause the one or more computer processors to execute operations comprising:

determining, based on a user-specified input received via a first user interface displayed on a user device of a user, an item of interest to the user and a first geographic region of the user;

accessing a plurality of electronic commerce websites of a plurality of geographic regions that are different from the first geographic region;

based on a determination that the item of interest is available at the plurality of electronic commerce websites of the plurality of geographic regions, aggregating and storing data associated with the item of interest within a ledger of a blockchain implemented on one or more remote servers;

retrieving social networking data for the user, from a remote server of social networking website, and processing the social networking data using natural language processing (NLP);

determining contacts of the user that are located in the plurality of geographic regions of the plurality of electronic commerce websites based on the processing of the social networking data using the NLP;

determining a likelihood of each contact of the contacts traveling to the first geographic region based on the social networking data;

selecting, from the contacts, a contact having a likelihood greater than a likelihood threshold;

selecting an electronic commerce website from the plurality of electronic commerce websites that offers the item of interest or a similar item, wherein the selected electronic commerce website corresponds to a second geographic region, of the plurality of geographic regions, of the selected contact;

presenting the selected electronic commerce website to the user, via the first user interface displayed on the user device of the user, as an option for obtaining the item of interest or the similar item, wherein the selected electronic commerce website is presented to the user as a dynamic website morphing suggestion, and in response to receiving a selection of the option via the user device of the user, routing the user from the first user interface to the selected electronic commerce website; and deleting the social networking data from a temporary storage, based on the presenting of the selected electronic commerce website.

16. The computer program product of claim 15, wherein the operations further comprise:

presenting the selected contact to the user as a shipping option for delivery of the item of interest or the similar item.

17. The computer program product of claim 15, wherein the operations further comprise:

extracting travel history data of the contacts from the social networking data using the NLP; and determining the likelihood of each contact of the contacts traveling to the first geographic region based on the extracted travel history data.

18. The computer program product of claim 15, wherein the operations further comprise:

extracting travel itinerary data of the contacts from the social networking data using the NLP; and determining the likelihood of each contact of the contacts traveling to the first geographic region based on the extracted travel itinerary data.

19. The computer program product of claim 15, wherein the selecting of the electronic commerce website from the plurality of electronic commerce websites includes choosing the electronic commerce website based on a purchase history of the user and a quality of the item of interest.

20. The computer program product of claim 15, wherein the selecting of the electronic commerce website from the plurality of electronic commerce websites includes choosing the electronic commerce website based on pricing information for the item of interest or the similar item.

* * * * *